United States Patent [19]

Bruning

[11] Patent Number: 4,498,539
[45] Date of Patent: Feb. 12, 1985

[54] SELECTIVE PLUGGING OF HIGHLY PERMEABLE SUBTERRANEAN STRATA BY IN SITU GELATION OF POLYMER SOLUTIONS

[75] Inventor: Donald D. Bruning, Bartlesville, Okla.

[73] Assignee: Phillips Petroleum Company, Bartlesville, Okla.

[21] Appl. No.: 552,558

[22] Filed: Nov. 16, 1983

[51] Int. Cl.³ .................... E21B 43/22; E21B 43/20; E21B 33/138
[52] U.S. Cl. ...................................... 166/294; 166/273
[58] Field of Search ............... 166/294, 285, 281, 292, 166/273, 295

[56] References Cited

U.S. PATENT DOCUMENTS

| | | |
|---|---|---|
| 3,386,509 | 6/1968 | Froning . |
| 3,699,042 | 10/1972 | Browning et al. . |
| 3,727,689 | 4/1973 | Clampitt . |
| 3,741,894 | 6/1973 | Storfer . |
| 3,749,172 | 7/1973 | Hessert et al. . |
| 3,753,971 | 8/1973 | Browning et al. . |
| 3,762,476 | 10/1973 | Gall . |
| 3,782,467 | 1/1974 | Hessert . |
| 3,785,437 | 1/1974 | Clampitt et al. . |
| 3,795,276 | 3/1974 | Eilers et al. . |
| 3,815,681 | 6/1974 | Richardson . |

*Primary Examiner*—Stephen J. Novosad
*Assistant Examiner*—Bruce M. Kisliuk
*Attorney, Agent, or Firm*—Lyell H. Carver

[57] ABSTRACT

A water permeability correction process, and composition therefor, to improve the sweep efficiency of waterflooding which involves the sequential injection of (1) an optional aqueous preflush slug to adjust connate water salinity, (2) an aqueous thickened slug comprising a sequestered polyvalent metal cation such as aluminum citrate, a gelable polymeric viscosifier such as polyacrylamide, and a hydrolyzable-pH-adjusting ester effective for delayed decreasing of the pH of the polymer slug which triggers in situ gelation to preferentially decrease water permeability in highly permeable thief zones, and, preferably, (3) an aqueous drive fluid.

28 Claims, 2 Drawing Figures

USE OF ESTER HYDROLYSIS TO ALTER PH OF AQUEOUS SOLUTION TO GELLING RANGE

ALUMINUM CITRATE/POLYACRYLAMIDE GELLING RANGE
AS A FUNCTION OF THE PH OF THE SOLUTION

SELECTIVE PLUGGING OF HIGHLY PERMEABLE SUBTERRANEAN STRATA BY IN SITU GELATION OF POLYMER SOLUTIONS

FIELD OF THE INVENTION

The invention pertains to a method for correcting the water permeability contrast of heterogeneous subterranean formations. In one aspect, the invention pertains to prolonged permeability contrast correction of underground strata. In a particular aspect, the invention pertains to the selective plugging of more permeable strata of subterranean formations by the injection therein of gelable aqueous polymer solutions and the delayed in-situ gelation thereof. In another aspect, the invention pertains to the creation of gel plugs in subterranean formations under controlled conditions. In a further aspect, the invention pertains to methods of water flooding. In a still further aspect, the invention pertains to polymer solutions and compositions.

BACKGROUND OF THE INVENTION

In waterflooding projects, the techniques of water diversion employed depend on the degree of heterogeneity of the porous media or strata being treated. The more permeable zones of the subterranean formation tend to take most of the injected fluids. While initially this is acceptable in sweeping oil from such zones of relatively high permeability, it subsequently becomes undesirable as the oil content of such strata becomes depleted since much of subsequently injected flood water or other fluid by-passes the relatively less permeable zones and provides little benefit in enhancing further hydrocarbon recovery.

An isolated high-permeability zone or fracture can be plugged at the well core face by a shallow layer of applied cement, though such a permanent relatively irrevocable technique often is undesirable. More desirably, a communicating high-permeability zone preferably is plugged to some considerable depth in order to be most effective in preventing flood water from otherwise merely flowing around a narrow shallow plug and back into the high-permeability or swept zone. In depth plugging of a relatively high-permeability zone converts the zone into a much lower permeability zone. Then, subsequently injected flood water or other fluid will tend to enter formerly by-passed but now relatively more-permeable hydrocarbon-bearing zones and thus mobilize increased amounts of hydrocarbons therefrom.

In depth plugging can be effected by the injection of gelable polymer-thickened aqueous solutions containing sequestered polyvalent metal cations which cause the gelation or crosslinking of the polymer-thickened solutions when the pH of the solution is in a gelation range. Alternatively, gelation can be effected by a redox system in which a polyvalent metal in a reducible oxidation state is used in combination with a reducing agent.

These gel-plugging techniques also are used during well workovers, in fracture treatments, and to correct the injection profile of a well by in depth sealing of streaks of relatively high permeability so that flooding fluids will enter the formation in a more useful front profile.

In many operations it is desirable to plug a portion of an underground formation so as to divert subsequently injected treating fluids into certain zones of the formation and yet be able to remove the stoppages from the formation after the particular treatment is completed.

An advantage in using gel-forming compositions for controlling the permeability of underground formations during waterflooding and chemical flooding procedures is the controllable nature of such blockages, since gel-breaking can be accomplished, when desired, by appropriate subsequent treatment.

Various methods have been used in the past to achieve in depth gelling, such as gelable systems triggered by a following aqueous acidic solution injection for subsequent pH adjustment. However, injecting an acidic solution following the polymer solution may result in gelation occurring so rapidly that a sufficient in depth plugging is not effectively obtained in the most permeable strata where desired. In another method, water, a polymer and a crosslinking agent capable of gelling the polymer such as a sequestered polyvalent metal cation, are admixed, and, just before injection into an underground formation, an acid is added thereto to effect gelation. But, when the acid is pre-mixed with the gelable composition, the gelation can be too fast, resulting in the necessity of shearing the gelled polymer in order to be able to obtain adequate injection, which reduces effectiveness of the gel.

Needed is a gelable injectable liquid composition which has an injection pH outside the gelable pH range yet processes the capability of forming the desirable gel in situ, without the need for additional follow-up injections of acids or other gel-triggering reagents, and method of employing same.

BRIEF DESCRIPTION OF THE INVENTION

I have discovered delayed gelable compositions for injection into and a method for applying to at least one well bore which compositions comprise water, a water-thickening amount of a polymer capable of gelling in the presence of a crosslinking agent, an amount of crosslinking agent capable of gelling and effective to gel the polymer, and an effective amount of a hydrolyzable ester. These components are admixed in a liquid state at a pH above the gelable range, thus in a non-gelable state. After the composition has penetrated into an underground formation and positioned itself preferentially in the highly permeable strata, the delayed gelation is triggered by the in situ hydrolysis of the contained ester so as to reduce the pH of the composition in situ into the gelable range, thereby producing in depth plugging of the strata with the now-gelled polymer.

In a water permeability contrast correction process (termed in previous disclosures water permeability correction process) to improve the sweep efficiency of waterflooding involving the sequential injection of (1) an optional aqueous preflush slug to adjust connate water salinity, (2) an aqueous polymer-thickened slug comprising a sequestered polyvalent metal cation such as aluminum citrate and a gelable polymeric viscosifier such as partially hydrolyzed polyacrylamide, and (3) an aqueous drive fluid, I incorporate a hydrolyzable-pH-adjusting ester for decreasing the pH into the aqueous polymer-thickened slug (2) so as to trigger delayed in situ gelation of the thickened slug, thus effecting preferential decrease in water permeability of the otherwise highly permeable thief zones.

My process has the advantage of an aqueous composition which itself is non-acidic and uses non-acidic materials which are easily handled and stored. The aqueous admixtures for injection are at an initial pH above about 7.5, thus relatively non-corrosive and easily handled without effecting or causing deterioration of piping, pumps, casings, and the like.

It is an object of my invention to provide an in depth permeability contrast correction composition and method for plugging of the more permeable strata in subterranean formations. It is also an object of my invention to provide a method for treating an underground formation in which the plugging is delayed by controlling the pH of the injected liquids until the liquids have been positioned deep within the underground formation. It is a further object of my invention to provide a gelable injectable liquid composition which has a pH outside the gelable pH range yet possesses the capability of forming the desirable gel in situ, without the need for additional follow-up injections of acids or other gel-triggering reagents, and method of employing same.

Other aspects, objects and the various advantages of this invention will become apparent upon reading this specification and the appended claims.

DETAILED DESCRIPTION OF THE INVENTION

Figure 1:
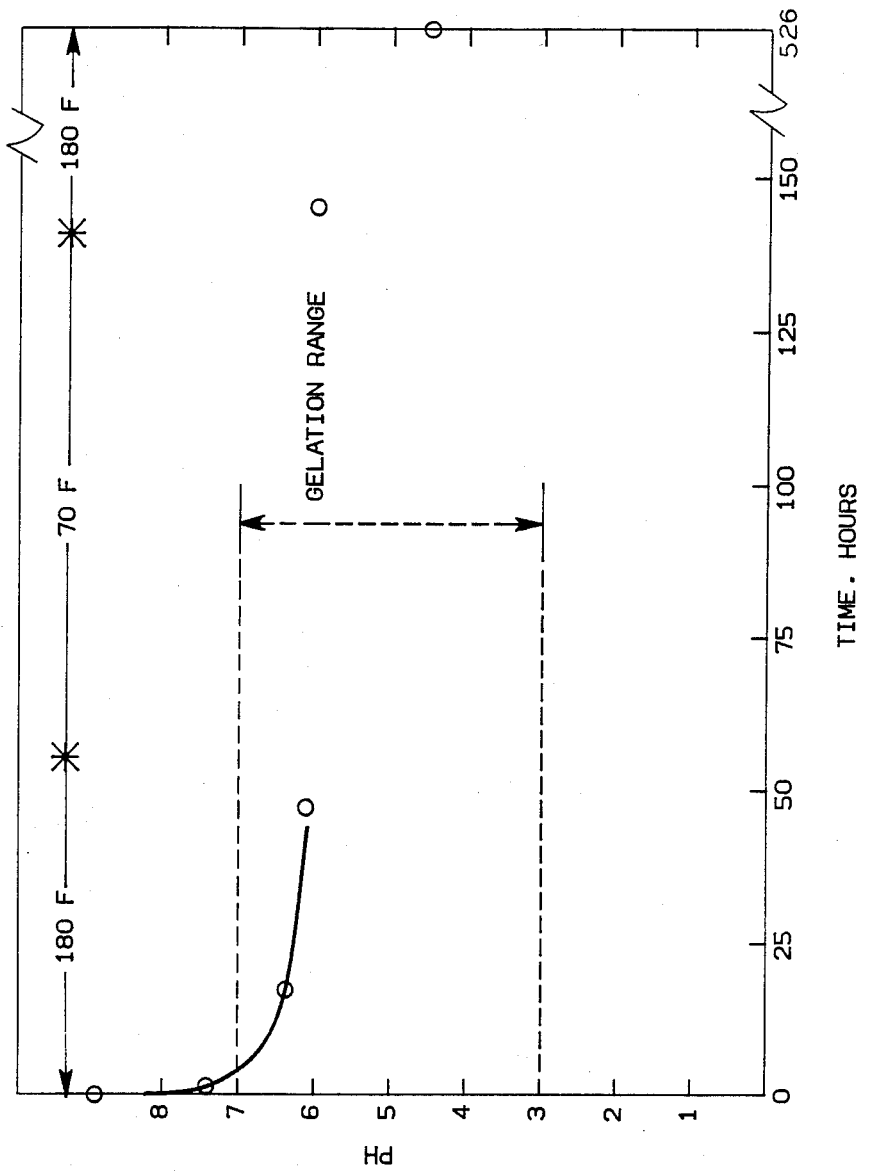
FIG. 1 illustrates that an ester, exemplified by 0.5 weight percent butyl acetate, undergoes hydrolysis in aqueous solution to reduce the pH of the aqueous solution from the initial alkaline pH of about 8.5 into the gelling range of about 3 to 7.

In accordance with my invention, I provide a composition gelable over a gelation pH range, comprising water, a water-thickening amount of a water-soluble or water-dispersible polymeric viscosifier, a polyvalent metal ion crosslinking agent, and a hydrolyzable carboxylate ester. The pH of the injected composition is self-adjustable in situ. In accordance with my invention, the composition contains an effective pH-adjusting (pH-lowering) amount of a hydrolyzable carboxylate ester. The ester is one which hydrolyzes under the conditions of temperature and pressure of the underground strata so as to lower the pH of the injected composition into the gelation range, thus triggering the gelation of the injected aqueous gelable composition.

In one embodiment of my invention, a plug is created in an underground formation by injecting into the formation an admixture of water, a polymer capable of gelling when in admixture with a crosslinking agent at a pH in the gelation range, a crosslinking agent capable of gelling the polymer in admixture therewith at a pH in the gelation range, and an ester hydrolyzable to reduce the pH of the admixture into the gelation range under conditions of temperature and pressure existing in the strata thereby triggering gelation.

The plugging can be substantially reduced or eliminated following the gelation plugging at any time convenient thereafter by injecting an agent such as sodium hypochlorite which is recognized in the art for its effectiveness in degrading polymeric viscosifiers such as polyacrylamides.

Polymers

Polymers suitable for use in this invention are those capable of gelling in the presence of polyvalent metal ion crosslinking agents within a gelation pH range. Polymers suitable for use in this invention, i.e., those capable of gelling in the presence of crosslinking agents within a gelation pH range, include biopolysaccharides, cellulose ethers, and acrylamide-based polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and carboxymethyl cellulose (CMC).

Suitable bipolysaccharides are disclosed in U.S. Pat. No. 4,068,714 (herein incorporated by reference). Particularly preferred is polysaccharide B-1459 which is a biopolysaccharide produced by the action of *Xanthomonas campestris* bacteria. This biopolysaccharide is commercially available in various grades under the trademark Kelzan ® (Kelco Company, Los Angeles, Calif.).

Suitable acrylamide-based polymers are disclosed in U.S. Pat. No. 3,749,172 (herein incorporated by reference). Particularly preferred are the so-called partially hydrolyzed polyacrylamides possessing pendant carboxylate groups through which crosslinking can take place. Thermally stable copolymers of acrylamide, such as poly(N-vinyl-2-pyrrolidone-coacrylamide) and poly(sodium-2-acrylamido-2-methyl-1-propanesulfonate-coacrylamide), are particularly preferred for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and the like.

Other miscellaneous polymers suitable for use in the present invention include partially hydrolyzed polyacrylonitrile, polystyrene sulfonate, lignosulfonates, methylolated polyacrylamides, and the like.

In general, the gelation pH range is a pH range of about 3 to 7. It is recognized that this range may vary somewhat for various polymers, or polymer-metal cation combinations or concentration relationships. The specific gelation pH range is readily determinable for a given or specific polymer or polymer-metal cation combination by testing same with additions of acid and following the resulting pH change until gelation is observed.

Presently preferred are the acrylamide based polymers, particularly the polyacrylamides and the partially hydrolyzed polyacrylamide, preferably in conjunction with $Al^{3+}$ as the metal cation, presently most preferably as the aluminum citrate complex.

The concentration or water-thickening amount of the water-soluble/dispersible polymer in the aqueous solution/dispersion can range widely and be as suitable and convenient for the various polymers, and for the degree of gelation needed for particular strata. Generally, the concentration of polymer in its aqueous solution/dispersion (before admixing with crosslinking components or ester) is about 1,000 to 20,000 ppm, preferably about 2,000 to 5,000 ppm.

Any suitable procedures for preparing the aqueous admixtures of the crosslinkable polymer can be used. Some of the polymers may require particular mixing conditions, such as slow addition of finely powdered polymer into the vortex of stirred water, alcohol prewetting, protection from air (oxygen), preparation of stock solutions from fresh rather than salt water, or the like, as is known for such polymers.

Crosslinking Agents

The crosslinking agents are solutions of multivalent (polyvalent) metal cations which are effective in type and concentration to gel the selected polymer when within the gelation pH range. Such polyvalent metal ions preferably are one or more of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$. Presently preferred are $Al^{3+}$ and $Cr^{3+}$, though $Al^{3+}$ is presently less preferred in high brines.

The polyvalent metal ions are employed in the form of compounds of or complexes with an effective sequestering or chelating amount of one or more chelating or sequestering anions. The chelating or sequestering anions typically are one or more of acetate, nitrilotriacetate, tartrate, citrate, tripolyphosphite, metaphosphite, gluconate, phosphate, including mixtures thereof. The chelating or sequestering agent retards the onset and rate of gelation of the polymer. Presently preferred is citrate.

The solution of polyvalent metal ion is prepared from a suitable water-soluble salt or compound of the metal, such as the chloride, nitrate, acetate, or the like, by admixing the metal salt or compound with sufficient amounts of water to make up a desired or convenient stock concentration. Fresh water is preferred for best solubility characteristics.

The sequestering agent usually is supplied or available as the sodium salt, or in some cases as the free acid. A stock solution is made up in water, preferably fresh water, to a convenient concentration, such as about 1 to 5 wt. percent of sequestering agent.

The polyvalent metal salt solution and the sequestering agent solution then are admixed in suitable proportion to result in the sequestered polyvalent metal ion solution. The amount of chelating or sequestering anion employed presently is considered to be an amount preferably sufficient to substantially associate with the metal ions present in the solution.

Generally, the molar ratio of polyvalent metal cation to sequestering anion varies over the broad range of about 1:1 to 6:1, preferably about 2:1 to 4:1, and presently most preferably about 2.5:1 to 3.5:1.

Generally, the ratio of number of polyvalent metal cations to crosslinkable side groups on the polymeric viscosifier will vary over the broad range of about 10:1 to 1:10, presently preferably about 5:1 to 1:1.

Conveniently, the polymer can be dispersed in a given amount of water, and to the dispersion then added the desired amounts of a solution or dispersion of the sequestered polyvalent metal cation crosslinking agent, and of the hydrolyzable ester.

After admixing with the aqueous solution of the crosslinking agent, the polymer concentration generally will be of the order of about 500 to 10,000 ppm, more usually about 1,000 to 2,500 ppm.

Esters

The ester employed should have at least measurable water-solubility for best effectiveness. Suitable hydrolyzable esters include those containing 3 to 6 carbon atoms, such as the formates, acetates, propionates, butyrates, and valerates, of alcohols containing 1 to 5 carbon atoms such as methanol, ethanol, n-propanol, 2-propanol, n-butanol, sec-butyl alcohol, and 2-methyl-1-propanol.

Representative esters include methyl acetate, ethyl propionate, propyl formate, isopropyl acetate, n-butyl acetate, isopropyl propionate, amyl formate, ethyl butyrate, methyl propionate, and the like, and mixtures thereof. The acetates of the alcohols containing 1 to 4 carbon atoms, such as n-butyl acetate, are presently preferred because of availability and ease of handling.

Compositions for Injection

The amount of crosslinking agent used depends largely on the amounts of polymer in solution. Lesser amounts of polymer require lesser amounts of crosslinking agent, and vice-versa. Further, it has been found that for a given concentration of polymer that increasing the amount of crosslinking agent generally substantially increases the formation plugging effectiveness.

The amount of ester employed can vary widely, depending on the amount of polymer, and should be that amount effective to cause gelling. Generally, the effective amount will be in the range of about 0.1 to 1, preferably about 0.25 to 0.75, weight percent based on the total weight of the injected slug of my in situ gelable composition. The upper limit will be controlled by the solubility of the ester in water.

The pH of the in situ gelable strata-treating compositions is critical to achieve effective plugging of the underground formation. The dilute aqueous polymer thickened compositions prepared at the surface including the hydrolyzable ester in accordance with my invention exhibit pH values of above about 7.5. The effective amount or content of hydrolyzable ester, below ground, gradually hydrolyzes under heat and pressure existing in the strata, effectively lowering the pH of the injected gelable composition into the gelation range, thus triggering gelation deep in the heart of the permeable strata.

Amount of In Situ Gelable Composition

The total quantity of in situ gelable treating composition employed can be expressed in terms of the pore volume of the area to be treated. For example, if a region (one or more stratum or portion thereof) to be treated is taking upwards of 80 volume % of the volume of injected fluid, a packer can be set to direct the treating composition into this zone. The quantity of treating composition can vary widely, depending on the effects desired, but generally from about 100% to 120% of the pore volume of the zone to be treated with the upper limit being governed merely by the practical limitations of pumping expense and chemical costs.

Preflush (Optional)

Prior to employment of the gelable compositions, the strata can be subjected to a conditioning preflush step.

The optional preflush employs aqueous solution with a lower level of hardness and/or total dissolved solids (tds) than that of the stratum connate water, of preferably containing substantially no hardness cations through it may be saline. The purpose of the preflush is to alter the salinity of the connate water by flushing the formation, generally with about one to three times the pore volume of the zone to be treated.

Since it is known that enhanced oil recovery chemicals such as surfactants and polymeric viscosifiers are adsorbed and/or precipitated to a greater extent in the presence of electrolytes and hardness cations in particular, the preflush alleviates this potential problem by sweeping out a certain fraction of such electrolytes. A typical NaCl preflush brine contains, e.g., on the order of about 0.2 to 2 weight percent total dissolved solids.

Aqueous Drive Fluid

The aqueous drive generally follows the permeability contrast correction process of my invention. The aqueous drive employs available field brines and/or fresh water if the latter is obtainable.

The aqueous drive, since it follows my in situ gelation treatment, is diverted to the (formerly) relatively less permeable oil-rich zones since the permeability contrast correction process shows or substantially prevents the flow of aqueous drive fluid through the (originally) more permeable but oil-poor zones (so-called thief zones). A successful permeability contrast correction operation generally is signaled at the production well by a lowering of the water/oil ratio in the produced fluid.

Subsequent to the permeability contrast correction, the water/oil ratio may gradually increase again after prolonged injection of the drive water. A gelation retreatment of the formation may be considered appropriate, if desired.

EXAMPLES

Examples are provided in order to assist one skilled in the art to a further understanding of the invention. Particular species employed, exemplary facets, equipment, and the like, are designed to be further illustrative of the invention and not limitative of the resonable scope thereof.

EXAMPLE I

This run demonstrates the feasibility of employing ester hydrolysis to alter the pH of aqueous solutions.

A stock solution of trisodium citrate and aluminum sulfate was prepared by dissolving 1.1 g of $Na_3C_6H_5O_7.2H_2O$ and 3.75 g of $Al_2(SO_4)_3.18H_2O$ in sufficient distilled water to make 300 g of solution. This stock solution was 0.037N in citrate and 0.11N in $Al^{3+}$.

3.125 g of this stock solution was mixed with 0.125 g n-butyl acetate and sufficient distilled water to give 50 g of mixture. The pH was adjusted to 8.5 to 9.0 by addition of dilute aqueous sodium hydroxide. The mixture was 0.25 wt. percent with respect to n-butyl acetate.

The 50 g mixture was placed in a glass vial and aged in an oil bath at 180° F. for approximately 51 hours, and then cooled to and maintained at 70° F. for about 95 hours and finally reheated to 180° F. for the balance of the total run of 526 hours. This aqueous solution was protected from $CO_2$ and other acidic gases throughout the test period. The pH of the ester-mixture was noted at various time intervals and the results are shown in Table I:

TABLE I

| pH Change in 0.25 Weight Percent Butyl Acetate Ester Solution With Time | | |
|---|---|---|
| Time | pH | Temperature, °F. |
| 0 | 8.8 | 180 |
| 1 hour | 7.7 | 180 |
| 19 hours | 6.3 | 180 |
| 48 hours | 6.1 | 180 |
| | | (cooled to 70° F. between these two data points) |
| 145 hours | 5.8 | 180 |

TABLE I-continued

| pH Change in 0.25 Weight Percent Butyl Acetate Ester Solution With Time | | |
|---|---|---|
| Time | pH | Temperature, °F. |
| 526 hours | 5.5 | 180 |

The progress of ester hydrolysis, and the reduction in pH, is shown graphically in FIG. 1. It is evident that after about 19 hours of aging at 180° F. that the pH of the mixture had decreased to about 6.3, and that after about 48 hours the pH had reached about 6. This reduction of pH by ester hydrolysis verifies the feasibility of the inventive process of ester hydrolysis for pH adjustment of aqueous solutions.

EXAMPLE II

This run demonstrates the effectiveness of ester hydrolysis to reduce the pH of an aqueous aluminum citrate/polyacrylamide mixture into a range which triggers gelation of the solution.

Stock solutions containing 5 wt. % aluminum sulfate as $(Al_2(SO_4)_3.18H_2O)$ and 4.4 wt. % trisodium citrate $(Na_3C_6H_5O_7.2H_2O)$ were prepared, respectively, by dissolving the appropriate amounts of $Al_2(SO_4)_3.18H_2O$ and $Na_3C_6H_5O_7.2H_2O$ in distilled water.

Polyacrylamide was dissolved in distilled water to give a 5,000 ppm (0.5 wt. % polyacrylamide) stock solution.

An aluminum citrate solution was prepared by mixing 60 g of the aluminum sulfate stock solution with 20 g of the trisodium citrate stock solution, and the pH of the admixture was adjusted to about 8.5 with dilute aqueous NaOH solution.

Gelling system solutions containing aliquots of the polyacrylamide solution and of the aluminum citrate solution were prepared, each further containing butyl acetate. Each was initially ungelled. Each admixture was aged at 120° F. for 9 days. This aqueous solution was protected from $CO_2$ and other acidic gases throughout the test period. The composition of each sample is tabulated in Table II:

TABLE II

| Gelation of Aluminum Citrate/Polyacrylamide Mixtures Containing Butyl Acetate @ 120° F. | | | | | |
|---|---|---|---|---|---|
| Composition | Polyacrylamide Solution (mL) | Aluminate Citrate Solution (mL) | Distilled $H_2O$ (mL) | Total Solution (mL) | Butyl Acetate (mL) |
| A | 10 | 2.5 | 7.5 | 20 | 0.2 |
| B | 10 | 5.0 | 5.0 | 20 | 0.2 |
| C | 10 | 7.5 | 2.5 | 20 | 0.2 |
| D | 7.5 | 3.75 | 8.75 | 20 | 0.2 |
| E | 5.0 | 2.5 | 12.5 | 20 | 0.2 |
| F | 2.5 | 1.25 | 16.25 | 20 | 0.2 |

Each composition, after the aging interval, had become gelled, thus establishing the effectiveness of my teaching.

EXAMPLE III

Figure 2:
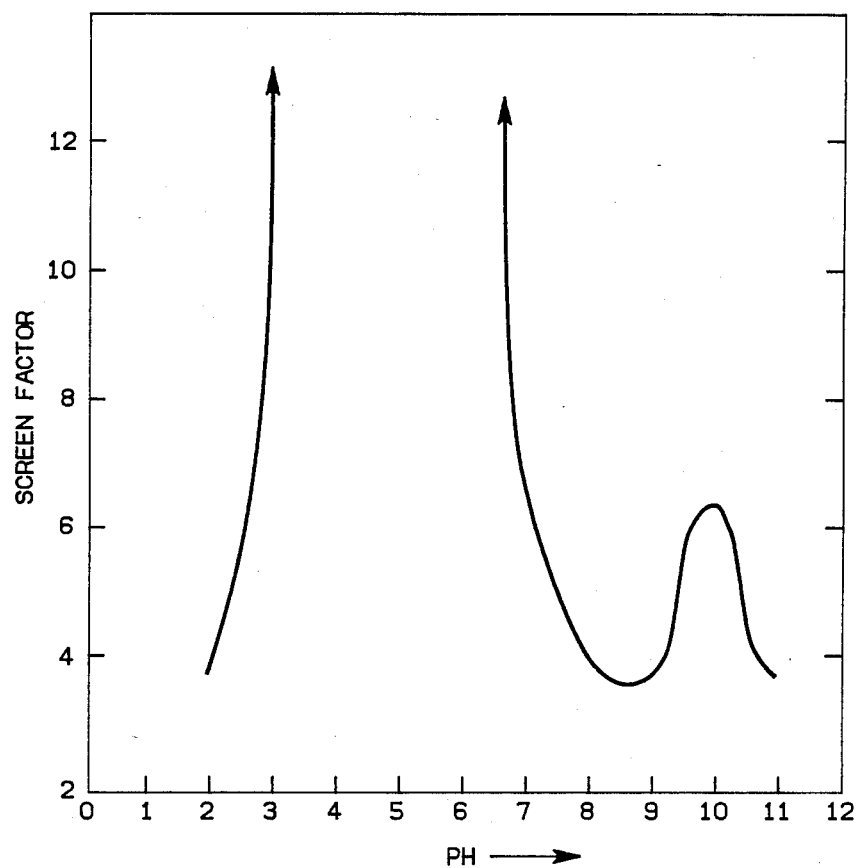
FIG. 2 illustrates the gelation of a polymer solution, exemplified by an aluminum citrate/polyacrylamide solution, as a function of pH, illustrating the dramatic gelling occurring within a pH range of about 3 to 7.

The attached FIG. 2 reflects a summary of data illustrating the pH gelling range for a polyacrylamide/aluminum citrate system.

In order to show the effect of changes in pH on the crosslinking behavior of an aluminum citrate system containing an aluminum/citrate molar ratio of 1.6:1, solution samples were characterized by measurement of screen factors.

Screen factor is the ratio of time periods required for a specified volume of a solution to pass through five 100-mesh stainless steel screens in a viscometer as compared to the time required for the passage of an equal volume of pure solvent through the screens.

For the graph shown in FIG. 2, the solvent employed was brine (NaCl) and the test solutions contained aluminum cations sequestered with citrate anions (molar ratio of aluminum to citrate 1.6:1) and polyacrylamide in aqueous salt brine media with pH adjusted over the range of 2 to 11.

A 1200 ppm brine solvent passed through the viscometer in about 7 seconds, and a 250 ppm solution of polyacrylamide (Dow Pusher 700) in 1200 ppm brine passed through in about 52.5 seconds, thus giving a screen factor of about 7.5 (52.5 sec/7.0 sec.).

Sample mixtures of aluminum citrate and of polyacrylamide were formulated over a range of pH values (2 to 11) and then individually passed through the viscometer. Magnitude of the screen factors observed were taken as a direct indicator of any crosslinking which had occurred in the sample, e.g., the greater the screen factor, the more extensive was the crosslinking.

FIG. 2 shows that the screen factor peaks in the range of about pH 3 to 7, and slightly from about 9 to 10, but for practical purposes, the effective gelation (crosslinking) pH range is about 3 to 7 since the peak in the pH range of 9 to 10 is so much smaller.

EXAMPLE IV

This run was carried out in essentially the same manner as the run described in Example II except for the following differences: the samples were aged at 180° F. for 5 days rather than at 120° F. for 8 days, and the polymer was a copolymer of acrylamide and 2-acylamido-2-methyl-1-propanesulfonic acid (sodium salt) rather than polyacrylamide. The operability of both butyl acetate and ethyl acetate was demonstrated by the formation, after aging, of good gels.

The disclosure, including data, has illustrated the value and effectiveness of my invention. The examples, the knowledge and background of the field of the invention and the general principles of chemistry and of other applicable sciences have formed the bases from which the broad descriptions of my invention including the ranges of conditions and the generic groups of operant components have been developed, and formed the bases for my claims here appended.

I claim:

1. A method for treating an underground formation which comprises injecting effective permeability control proportions of an in situ gelable composition comprising effective ratios of:
   (a) water,
   (b) at least one polymer capable of gelling with a crosslinking agent within a gelation pH range,
   (c) at least one crosslinking agent comprised of sequestered polyvalent metal cations,
   (d) at least one sequestering anion, and
   (e) at least one hydrolyzable organic ester.

2. The method of claim 1 wherein said polymer is present in said in situ gelable composition in an amount of about 500 to 10,000 ppm.

3. A method according to claim 2 wherein said polymer comprises polyacrylamide, said polyvalent cation comprises $Al^{3+}$, and said chelating/sequestering anion comprises citrate.

4. The method of claim 2 employing in said in situ gelable composition a range of about 10:1 to 1:10 ratio of polyvalent metal cation to cross-linkable groups of the polymer; and a molar ratio of about 1:1 to 6:1 polyvalent metal cation:sequestering agent.

5. The method of claim 1 wherein said polymer is selected from the groups consisting of biopolysaccharides, cellulose ethers, acrylamide-based polymer, partially hydrolyzed polyacrylonitriles, polystyrene sulfonates, lignosulfonates, methylolated polyacrylamides, and mixtures.

6. The method of claim 5 wherein said polyvalent metal cation is selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, $Cr^{3+}$, and mixtures; and said chelating/sequestering agent is selected from the group consisting of acetate, nitrilotriacetate, tartrate, citrate, tripolyphosphate, metaphosphate, gluconate, phosphate, and mixtures thereof.

7. The process of claim 6 wherein said hydrolyzable ester is selected from the formates, acetates, propionates, butyrates, and valerates of monohydric alcohols containing 1 to 5 carbon atoms.

8. The process of claim 7 wherein said ester is selected from the group consisting of methyl acetate, ethyl propionate, propyl formate, isopropyl acetate, n-butyl acetate, isopropyl propionate, amyl formate, ethyl butyrate, methyl propionate, and mixtures thereof.

9. The process of claim 8 employing in said aqueous gelable composition about:
   500 ppm to 10,000 ppm of said polymer;
   about 10:1 to 1:10 ratio of said polyvalent metal cation:cross-linkable groups of the polymer; and
   about 0.1 to 1 weight percent of said ester based on the total weight of said composition.

10. The process of claim 1 preceded by an aqueous preflush slug to adjust connate water salinity.

11. A process of controlling sweep efficiency in a subterranean formation which comprises the sequential injection of effective quantities of:
   (1) an aqueous preflush slug to adjust connate water salinity,
   (2) an in situ gelable aqueous thickened slug comprising a sequestered polyvalent metal cation, a gelable polymeric viscosifier, and a hydrolyzable pH-reducing organic ester, and
   (3) an aqueous drive fluid;
   wherein said ester is a hydrolyzable-pH-adjusting ester effective to decrease in situ of the pH of said thickened slug so as to trigger delayed in situ gelation of the thickened slug thus effecting preferential decrease in water permeability of the otherwise highly permeable thief zones.

12. The process of claim 11 wherein said aqueous preflush comprises a sodium chloride brine.

13. The process of claim 12 wherein said in situ gelable slug comprising effective ratios of:
   (a) water,
   (b) a polymer capable of gelling with a crosslinking agent at a pH in the gelation range of 3 to 7,
   (c) a crosslinking agent comprised of sequestered polyvalent metal cations, selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, (d) chelating anions selected from the group consisting of acetate, nitrilotriacetate, tartrate, citrate, tripolyphosphate, metaphosphate, gluconate, phosphate, and mixtures thereof, and (e) said hydrolyzable ester.

14. The method of claim 13 wherein the polymer is present in said gelable composition in an amount of about 500 to 10,000 ppm.

15. A method according to claim 14 wherein the polymer comprises partially hydrolyzed polyacrylamide, said multivalent cation comprises $Al^{3+}$, and said chelating anion comprises citrate.

16. The method of claim 14 wherein said multivalent cation is present in said aqueous gelable solution in a ratio of about 10:1 to 1:10 polyvalent metal cation:cross-linkable groups of the polymer; and said chelating anion is present in a molar ratio of about 1:1 to 6:1 polyvalent metal cation:sequestering anion.

17. The process of claim 16 wherein said polymer is selected from the groups consisting of biopolysaccharides, cellulose ethers, acrylamide-based polymers, partially hydrolyzed polyacrylonitriles, polystyrene sulfonates, lignosulfonates, methylolated polyacrylamides, and mixtures.

18. The process of claim 17 wherein said hydrolyzable ester is selected from the formates, acetates, propionates, butyrates, and valerates of monohydric alcohols containing 1 to 5 carbon atoms.

19. The process of claim 18 wherein said ester is selected from the group consisting of methyl acetate, ethyl propionate, propyl formate, isopropyl acetate, n-butyl acetate, isopropyl propionate, amyl formate, ethyl butyrate, methyl propionate, and mixtures thereof.

20. The process of claim 19 employing in said aqueous gelable composition about:

500 ppm to 10,000 ppm of said polymer;
about 10:1 to 1:10 ratio of said polyvalent metal cation:cross-linkable groups of the polymer; and
about 0.1 to 1 weight percent of said ester based on the total weight of said composition.

21. A process according to claim 20 wherein said polymer comprises polyacrylamide, the polyvalent cation is $Al^{3+}$, and the chelating/sequestering anion is citrate.

22. A gelable composition comprising effective gelation ratios of:

(a) water,
(b) a polymer capable of gelling with a crosslinking agent at a pH in the range of 3 to 7,
(c) a crosslinking agent comprised of sequestered polyvalent metal cations, selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$,
(d) chelating/sequestering anions selected from the group consisting of acetate, nitrilotriacetate, tartrate, citrate, tripolyphosphate, metaphosphate, gluconate, phosphate, and mixtures thereof, and
(e) a hydrolyzable organic ester.

23. The gelable composition of claim 22 wherein the polymer is present in said gelable composition in an amount of about 500 to 10,000 ppm.

24. The gelable composition of claim 23 wherein the multivalent cation is present in said aqueous gelable solution in a molar ratio of about 10:1 to 1:10 polyvalent metal cation:cross-linkable groups of the polymer; and said chelating anion is present in a molar ratio of about 1:1 to 6:1 polyvalent metal cation:sequestering anion.

25. The gelable composition of claim 24 wherein said polymer is selected from the groups consisting of biopolysaccharides, cellulose ethers, acrylamide-based polymers, partially hydrolyzed polyacrylonitriles, polystyrene sulfonates, lignosulfonates, methylolated polyacrylamides, and mixtures.

26. The gelable composition of claim 25 wherein said hydrolyzable ester is selected from the group consisting of formates, acetates, propionates, butyrates, and valerates of monohydric alcohols containing 1 to 5 carbon atoms.

27. The gelable composition of claim 26 wherein said ester is selected from the group consisting of methyl acetate, ethyl propionate, propyl formate, isopropyl acetate, n-butyl acetate, isopropyl propionate, amyl formate, ethyl butyrate, methyl propionate, and mixtures thereof.

28. The gelable composition of claim 26 employing about:

500 ppm to 10,000 ppm of said polymer;
about 10:1 to 1:10 ratio of said polyvalent metal cation:cross-linkable groups of the polymer; and
about 0.1 to 1 weight percent of said ester based on the total weight of said composition.

* * * * *